US006919861B2

(12) United States Patent
Miyano et al.

(10) Patent No.: US 6,919,861 B2
(45) Date of Patent: Jul. 19, 2005

(54) ARRAY ANTENNA APPARATUS

(75) Inventors: Kentaro Miyano, Yokohama (JP); Yoichi Nakagawa, Tokyo (JP); Masahiro Mimura, Tokyo (JP); Yoshio Koyanagi, Ebina (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/399,032

(22) PCT Filed: Sep. 5, 2002

(86) PCT No.: PCT/JP02/09040

§ 371 (c)(1), (2), (4) Date: Apr. 16, 2003

(87) PCT Pub. No.: WO03/023955

PCT Pub. Date: Mar. 20, 2003

(65) Prior Publication Data

US 2003/0189514 A1 Oct. 9, 2003

(30) Foreign Application Priority Data

Sep. 6, 2001 (JP) ........................................ 2001-270141

(51) Int. Cl.[7] ............................ H01Q 1/00; H04B 1/18
(52) U.S. Cl. ...................................... 343/904; 455/280
(58) Field of Search ................................ 343/834, 836, 343/837, 904; 455/276.1, 272, 296, 422, 426, 118, 140, 139, 208, 280

(56) References Cited

U.S. PATENT DOCUMENTS 6,252,560 B1 * 6/2001 Tanaka et al. .............. 343/853
6,400,318 B1 * 6/2002 Kasami et al. .............. 342/383
6,449,469 B1 * 9/2002 Miyahara .................... 455/273
6,456,238 B1 * 9/2002 Posey ........................ 342/427
6,600,456 B2 * 7/2003 Gothard et al. ............ 343/834
2003/0050020 A1 * 3/2003 Erceg et al. ............... 455/101
2003/0206134 A1 * 11/2003 Lier et al. .................. 342/368

FOREIGN PATENT DOCUMENTS

JP 8-288895 11/1996

OTHER PUBLICATIONS

English Language Abstract of JP 8–288895.

* cited by examiner

*Primary Examiner*—Shih-Chao Chen
*Assistant Examiner*—Minh Dieu A
(74) *Attorney, Agent, or Firm*—Greenblum & Bernstein, P.L.C.

(57) ABSTRACT

Antenna elements are provided along a linear line at regular intervals to be parallel to each other. The antenna elements receive signals transmitted from a communicating partner and output the signals to a receiving beam former. In the receiving beam former, phase shifters phase-shift the received signals input from the antenna elements of an even element number by $\pi$. A combiner adds the received signals that are phase-shifted by $\pi$ in phase shifters and the signals input from the antenna elements of an odd number to form a received beam. With this configuration, it is possible to realize an array antenna apparatus of a small and simple configuration that reduces the radiation of radio waves to the human body and to other equipment and that is influenced little by the human body and by other equipment.

10 Claims, 13 Drawing Sheets

ARRAY ANTENNA APPARATUS

TECHNICAL FIELD

The present invention relates to an array antenna apparatus that is suitable for use in electronic apparatuses such as cellular phones.

BACKGROUND ART

With the number of users of mobile wireless terminal apparatuses including cellular phones and PHS growing over recent years, the service areas that the base station apparatus covers have become smaller zones. Due to this, the radio waves transmitted from the base station apparatus are likely to arrive at the mobile wireless terminal apparatus only from limited directions. So, the more non-directional, the more effectively an antenna transmits and receives radio waves, regardless of the circumstances.

However, if the operator uses a mobile wireless terminal apparatus close to the human body such as while talking where a practically non-directional antenna is used, the radio waves radiated to the direction of the human body are absorbed into the human body, thereby reducing the radiation efficiency in the human body's direction. Additionally, there have been concerns about the influence of the radio waves absorbed into the human head, in view of which it is preferable that an antenna's directivity is not in the direction of the human body when the mobile wireless terminal apparatus is used at a short distance from the human body.

The invention recited in Japanese Patent Application Publication No. HEI8-288895 concerns a technique for solving the above problems. The invention recited in the above publication is configured such a phase circuit is provided whereby a plurality of antennas are excited given predetermined phase difference, and the radiation of radio waves to the operator and the radio waves absorbed into the human head are reduced, thereby preventing wasteful power consumption while talk is in progress. During the waiting period, there is little need for the reduction of radio waves to the human head, and so causing non-directivity using only one antenna can result in improved antenna efficiency.

Nevertheless, according to the above conventional art, the length of the interval between antenna elements accords with the wavelength, which makes it difficult to apply this conventional technique to mobile wireless terminal apparatuses that have been miniaturized by the remarkable technological developments of late. Another problem is that the amount of a phase shift in a phase shifter is not fixed and needs to be changed depending on the interval between and the position of antenna elements, as a result of which the apparatus becomes complex and the circuit scale increases. Moreover, in recent years, it is not only mobile wireless terminal apparatuses that implement wireless communications, but also such information apparatuses as personal computers and printers implement wireless communications. Still, the above conventional art does not take into account the problem of inefficiency that arises when apparatuses absorb the radiowaves radiated from the above information apparatuses, and the problem of incorrect operation that arises when the apparatuses to which the radio waves are radiated.

DISCLOSURE OF INVENTION

It is therefore one of the primary objects of the present invention to provide an array antenna apparatus that reduces the radiation of radio waves to the human body and equipment, that is influenced little by the human body and equipment, and that is configured small and simple.

BEST MODE FOR CARRYING OUT THE INVENTION

Through analysis of the results of field research, the inventors have found out that the 8-shape directivity, commonly associated with mediocre reception characteristics, is capable of obtaining substantially the same received power as by non-directivity that optimizes the reception characteristics, and that it takes only simple configurations to form an 8-shape directivity. Now, the essence of the present invention lies in that an even number of antenna elements are disposed on a linear line at regular intervals and to be parallel to each other, signals are shifted to allow a π (−π) phase difference between the signals received by adjacent antenna elements, and these signals are combined and received, and in that a transmission signal is divided into a number corresponding to the number of antenna elements, and signals are shifted to allow a π (−π) phase difference between the signals transmitted from the signals transmitted from adjacent antenna elements and are transmitted. By this means, an array antenna apparatus, configured small and simple, can form an 8-shape directivity in such a way that creates a null in a direction that is perpendicular to a liner line that links antenna elements and thus cause a null in the direction of the human body and equipment. Incidentally, as for the 8-shape, it denotes such a directivity that runs through the middle of the length of an antenna element and that is on a plane that is perpendicular to the element. “8-shape” is used to denote the above.

With reference to the accompanying drawings now, embodiments of the present invention will be described below.

(First Embodiment)

A case will be described here with the present embodiment where an array antenna apparatus that forms a directivity in such a way that creates a null in the direction where the human body and equipment are present, is employed as a receiving antenna apparatus.

Figure 1:
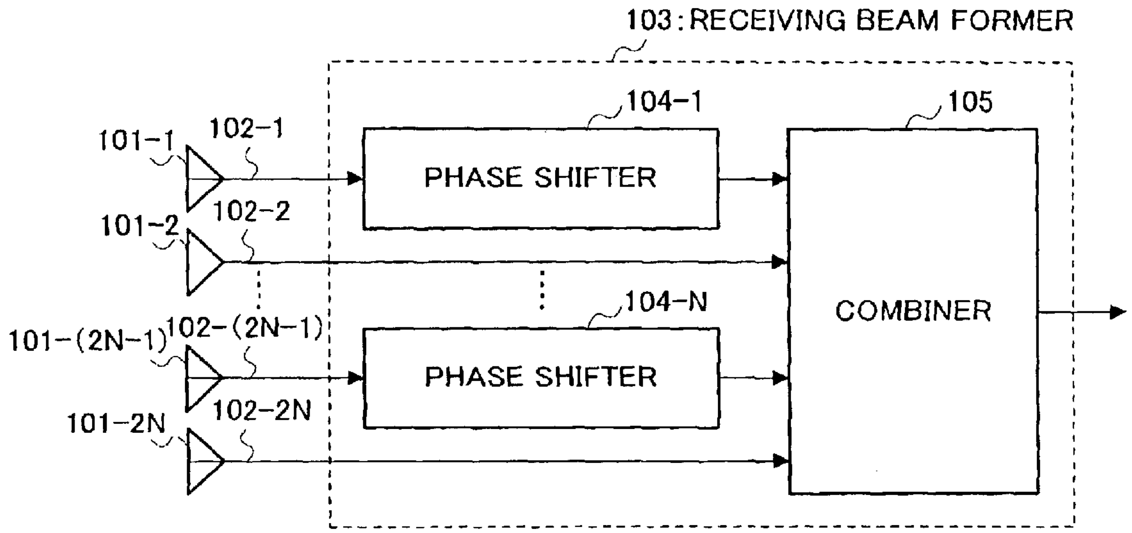
FIG. 1 is a block diagram showing a configuration of a receiving antenna apparatus according to the first embodiment of the invention.

FIG. 1 is a block diagram showing a configuration of a receiving antenna apparatus according to the first embodiment of the invention. Referring to this figure, antenna elements 101-1~101-2N, provided on a linear line at regular intervals to be parallel to each other, receive signals transmitted from the communicating partner and output the received signals to receiving beam former 103. The signals (received signals 102-1~102-2N) received by the separate antenna elements are output to beam former 103.

Receiving beam former 103 inputs the received signals from the antenna elements having an odd element number (101-1, 101-3, . . . , 101-(2N−1)) into phase shifters 104-1~104-N, and likewise, inputs the signals from the antenna elements having an even element number (101-2, 101-4, . . . , 101-2N) into combiner 105. Phase shifters 104-1~104-N each shift the phase of the input signal by π. The signals that are phase-shifted by π are input into combiner 105.

Combiner 105 adds up all the received signals including those that are phase-shifted by π through phase shifters 104-1~104-N and those that are input from the even-numbered antenna elements, so as to form a receiving directivity. By this means, receiving beam former 103 forms a direction (directivity) of receiving beams.

By thus phase-shifting the received signals in such a way that creates a π phase difference between the signals received by adjacent antenna elements, when an 8-shape directivity forms, it becomes unnecessary to adjust the interval at which the antenna elements are disposed to the length that accords with the wavelength, and the interval between the antenna elements can be lessened. As a result, the array antenna apparatus can be miniaturized. Furthermore, by fixing the amount of a phase shift in a phase shifter at π, it is possible to avoid complication and circuit-scale enlargement of apparatus, and realize an array antenna apparatus with a simple configuration, compared to where a phase shifter changes the phase shift amount.

Figure 2:
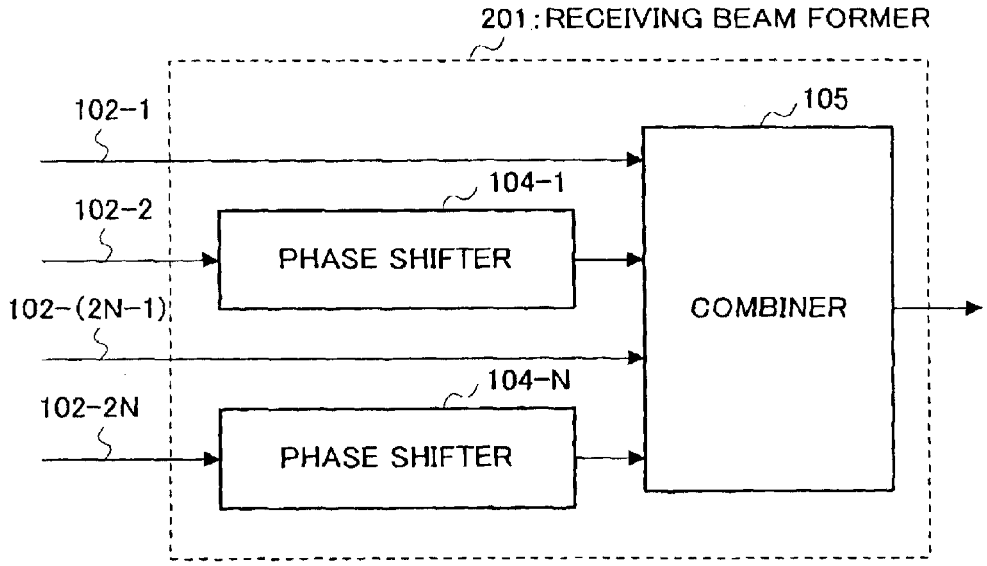
FIG. 2 is a block diagram showing an inner configuration of a receiving beam former.

Although FIG. 1 shows that receiving beam former 103 phase-shifts the received signals input from the antenna elements having an odd element number by π, it is also possible to phase-shift the signals output from the antenna elements having an even element number by π as by receiving beam former 201 shown in FIG. 2.

Figure 3:
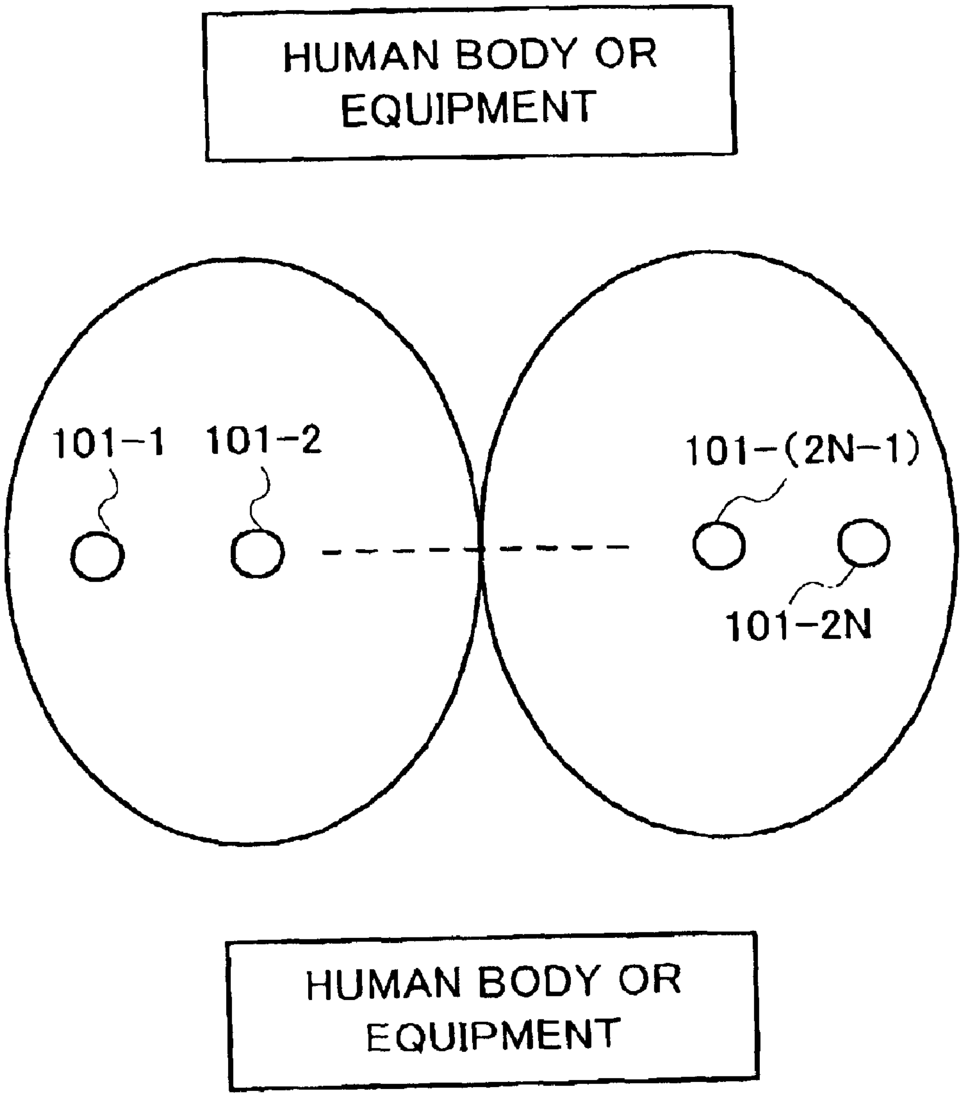
FIG. 3 is a conceptual diagram showing a directivity formed by a receiving antenna apparatus according to the first embodiment of the invention.

Next, the directivity that the above configured receiving antenna apparatus forms will be explained. FIG. 3 is a conceptual diagram showing a directivity formed by the receiving antenna apparatus of the first embodiment of the invention. FIG. 3 is a left side view of FIG. 1, wherein an 8-shape directivity is formed with a null created in a direction that is perpendicular to the linear line that links the antenna elements. By thus forming an 8-shape directivity in such a way that creates a null in a direction where the human body and equipment are highly likely to be present, it is possible to realize a receiving antenna apparatus that is influenced little by the human body and equipment.

Figure 4:
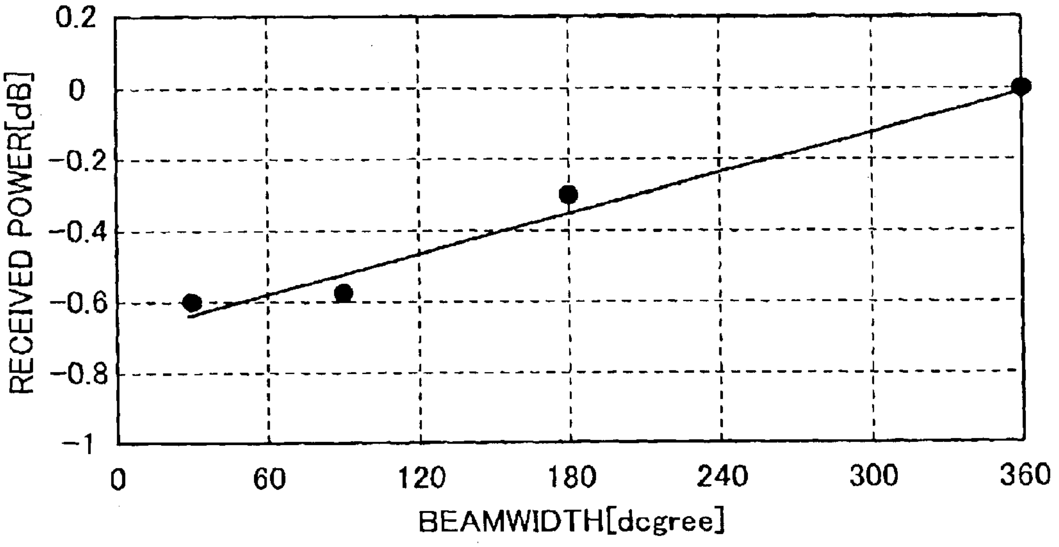
FIG. 4 shows an antenna's reception characteristics.

Now the relationship between the directivity shaped by the above-described receiving antenna apparatus and its reception characteristic will be explained using FIG. 4 and FIG. 5 prepared based on the data obtained from field research. First, FIG. 4 is a graph showing the relationship between the beamwidth and the received power of an antenna. In this figure, the horizontal axis denotes the beamwidth [° (degree)], shown in 0~360, while the vertical axis denotes the received power [dB]. A small-valued beamwidth denotes a sharp directivity; a larger-valued beamwidth is closer to non-directivity. As obvious from FIG. 4, the received power increases as the beamwidth grows, and the 360° beamwidth corresponds to the maximum received power 0 [dB]. In other words, the received power becomes the highest when there is non-directivity.

Figure 5:
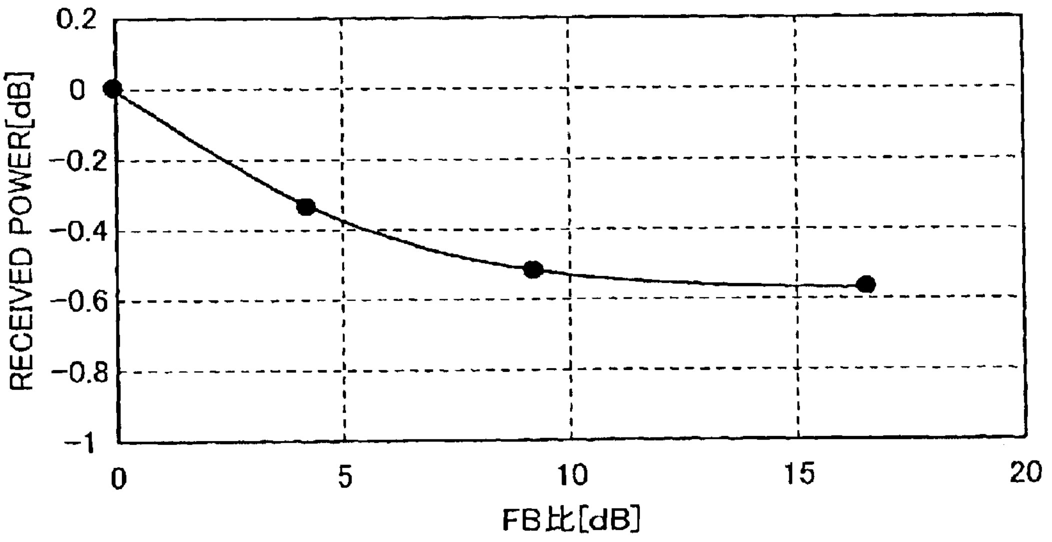
FIG. 5 shows an antenna's reception characteristics.

Next, assuming that an antenna’s directivity has an 8-shape, the graph of FIG. 5 illustrates the relationship between the FB ratio [dB] and the received power [dB]. In this figure, the horizontal axis denotes the FB ratio [dB] while the vertical axis denotes the receive power [dB]. When the FB ratio is 0 [dB], two directivities are formed with equal electric field strength. As the FB ratio grows bigger, of the two directivities, only one directivity develops its electric field strength, and the electric field strength of the other directivity decreases. As obvious from FIG. 5, the maximum received power 0 [dB] is obtained when the FB ratio is 0 [dB], and the received power decreases as the FB ratio grows.

FIG. 4 and FIG. 5 show that when the FB ratio is 0 [dB], the same received power is obtained as by non-directivity (the beamwidth of 360 [°]). That is, if an 8-shape directivity is formed in such a way that the FB ratio becomes 0 [dB], the same superior reception characteristics can be obtained as by non-directivity.

Thus according to the present embodiment, by disposing a plurality of antenna elements on a linear line at regular intervals to be parallel to each other, by phase-shifting received signals in such a way that the phase difference between the signals received by adjacent signals becomes π, and by adding up all the signals received by all the antenna elements, it is possible to realize a small and simple receiving antenna apparatus that forms 8-shape directivity. By this means, it is possible to reduce the influence from the human body or equipment present in the null direction.

Further, with the present embodiment, any signals can be input into receiving beam former 103 including down-converted baseband signals and A/D converted signals. Receiving beam former 103 can be configured with a frequency converter unit, a demodulator, or an A/D converter. When dealing with A/D converted signals, it is possible to change the amplitude and phase digitally.

Further still, although a phase shifter of the present embodiment carries out a phase shift by π, a −π phase shift is also possible.

(Second Embodiment)

A case will be described here with the present embodiment where an array antenna apparatus that forms a directivity in such a way that creates a null in a direction where the human body and equipment are present, is employed as a transmitting antenna apparatus.

Figure 6:
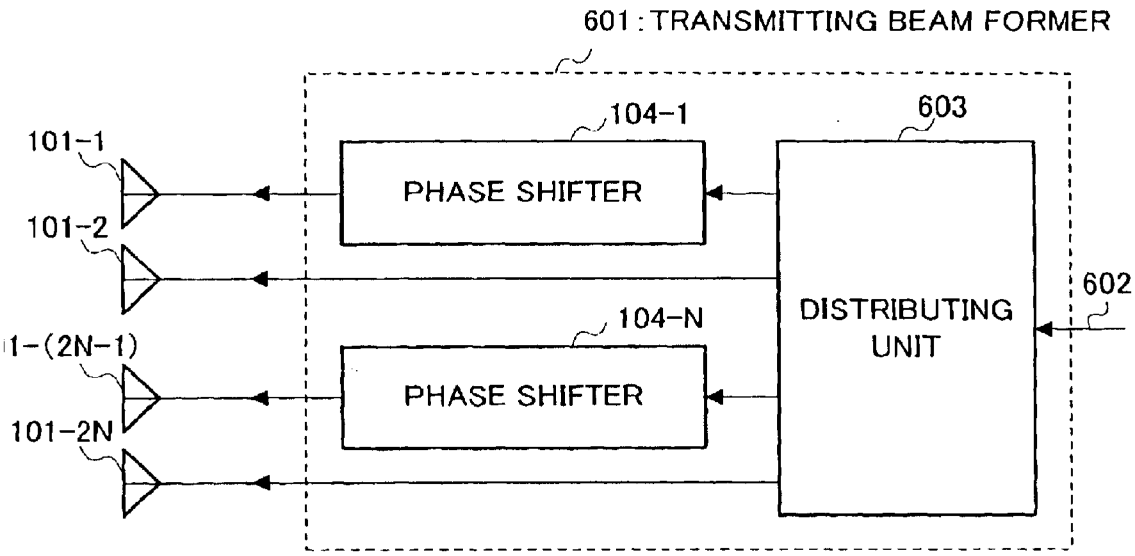
FIG. 6 is a block diagram showing a configuration of a transmitting antenna apparatus according to the second embodiment of the invention.

FIG. 6 is a block diagram showing a configuration of a transmitting antenna apparatus according to the second embodiment of the present invention. Parts in this figure identical to those of FIG. 1 are assigned the same numerals as in FIG. 1 without further explanations. Referring to FIG. 6, in order to form a direction (directivity) of the transmitting beams, transmitting beam former 601 executes predetermined processing upon transmitting signal 602, and outputs the transmitting signal after the processing to antenna elements 101-1~101-2N. More specifically, distributing unit 603 divides transmitting signal 602 into a number corresponding to the number of the antenna elements (2N units) and outputs the divided transmitting signals to phase shifters 104-1~104-N provided in front of the antenna elements having an odd element number. The divided transmitting signals are output also to the antenna elements having an even element number.

By thus phase-shifting the transmitting signals in such a way that creates a π phase difference between the signals transmitted from adjacent antenna elements, when an 8-shape directivity forms, it becomes unnecessary to adjust the interval at which the antenna elements are disposed to the length that accords with the wavelength, and the interval between the antenna elements can be lessened. As a result, the array antenna apparatus can be miniaturized. Furthermore, by fixing the amount of a phase shift in a phase shifter at π, it is possible to avoid complication and circuit-scale enlargement of the apparatus, and realize an array antenna apparatus with a simple configuration, compared to where a phase shifter changes the phase shift amount.

Figure 7:
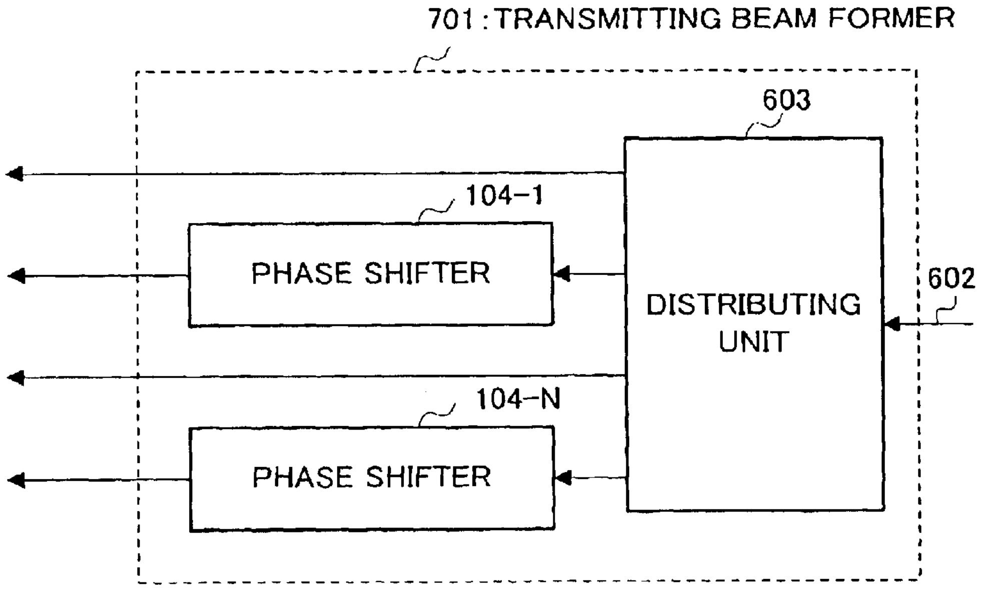
FIG. 7 is a block diagram showing an inner configuration of a transmitting beam former.

Although FIG. 6 shows that transmitting beam former 601 phase-shifts the signals transmitted from the antenna elements having an odd element number by π, it is also possible to phase-shift the signals transmitted from the antenna elements having an even element number by π as by transmitting beam former 701 shown in FIG. 7.

As shown in FIG. 4, the above-configured transmitting antenna apparatus forms a directivity in such a way that creates a null in a direction that is perpendicular to a linear line that links antenna elements. By thus forming an 8-shape directivity in such a way that positions the human body and equipment in the null direction, it is possible to realize a transmitting antenna apparatus that reduces the radiation to the human body and equipment.

Thus according to the present embodiment, by dividing a transmission signal into a number corresponding to the number of antenna elements by a distributing unit, disposing a plurality of antenna elements on a linear line at regular intervals to be parallel to each other, phase-shifting transmitting signals in such a way that the phase difference between the signals transmitted from adjacent signals becomes π, and by transmitting the signals respective antenna elements, it is possible to realize a small and simple transmitting antenna apparatus that forms 8-shape directivity. By this means, it is possible to reduce the radiation to the human body and equipment present in the null direction.

Further, with the present embodiment, any signals can be input into a transmitting beam former including up-converted baseband signals and D/A converted signals. A transmitting beam former can be configured with a frequency converter unit, a modulator, or a D/A converter. When the configuration comprises a D/A converter, it is possible to change the amplitude and phase digitally.

Further still, although a phase shifter of the present embodiment carries out a phase shift by π, a −π phase shift is also possible.

In the present application, an array antenna apparatus comprises an even number of antenna elements and a receiving beam former and/or a transmitting beam former.

(Third Embodiment)

A case will be described here with the present embodiment where a mobile wireless terminal apparatus comprises a receiving antenna apparatus that accords with the description of the first embodiment and a transmitting antenna apparatus that accords with the description of the second embodiment.

Figure 8:
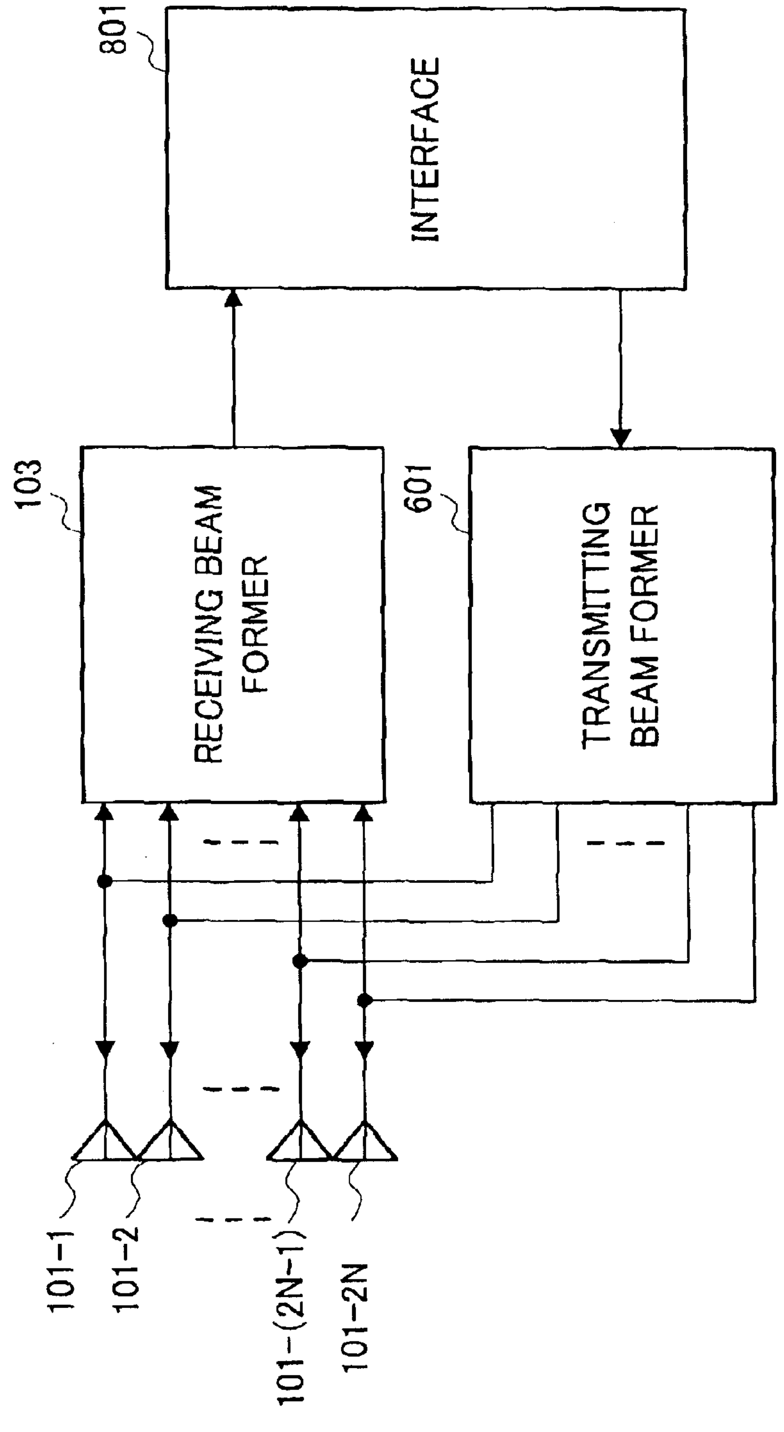
FIG. 8 is a block diagram showing a configuration of wireless apparatus according to the third embodiment of the invention.

FIG. 8 is a block diagram showing a configuration of a mobile wireless terminal apparatus according to the third embodiment of the invention. In this figure, receiving beam former 103 is identical with the receiving beam former shown in FIG. 1 or FIG. 2, and transmitting beam former 601 is identical with the transmitting beam former shown in FIG. 6 and FIG. 7, and their detailed explanations are omitted.

Antenna elements 101-1~101-2N are disposed on a linear line at regular intervals to be parallel with each other, receive the signals transmitted from the communication partner, and output them to receiving beam former 103. Moreover, the signals output from transmitting beam former 601 are transmitted to the communication partner.

Interface 801 comprises at least one from a display that displays receiving data or transmitting data etc, a data input unit for inputting receiving data and transmitting data etc, and a receiver that enables speech communication. A received signal output from receiving beam former 103 is sent to the operator as receiving data through interface 801. The data (transmitting data) that the operator inputs through interface 801 is output to transmitting beam former 601 as a transmitting signal.

As shown in FIG. 3, the above-configured mobile wireless terminal apparatus forms a directivity in such a way that creates a null in a direction that is perpendicular to a linear line that links antenna elements. By thus forming an 8-shape directivity with a null created in a direction where the human body and equipment are highly likely to be present, it is possible to realize a mobile wireless terminal apparatus that is influenced little by the human body and equipment and reduces the radiation to the human body and equipment.

The mobile wireless terminal apparatus of the present embodiment is not limited to such terminals as cellular phones and PHS, and can be extended to data transmitting/receiving terminals such as for e-mail and personal computers that carry wireless communication functions.

Thus according to the present embodiment, by comprising a mobile wireless terminal apparatus with a receiving beam former that accords with the description of the first embodiment and a transmitting beam former that accords with the description of the second embodiment, it is possible to realize a mobile wireless terminal apparatus that forms an 8-shape directivity, reduce the influence from the human body and equipment present in the null direction, and reduce the radiation to the human body and equipment present in the null direction.

Further still, receiving beam former 103 of the present embodiment may be configured to implement diversity reception wherein antenna elements of good receiving sensitivity are selected, instead of forming beams (directivity).

(Fourth Embodiment)

Figure 9:
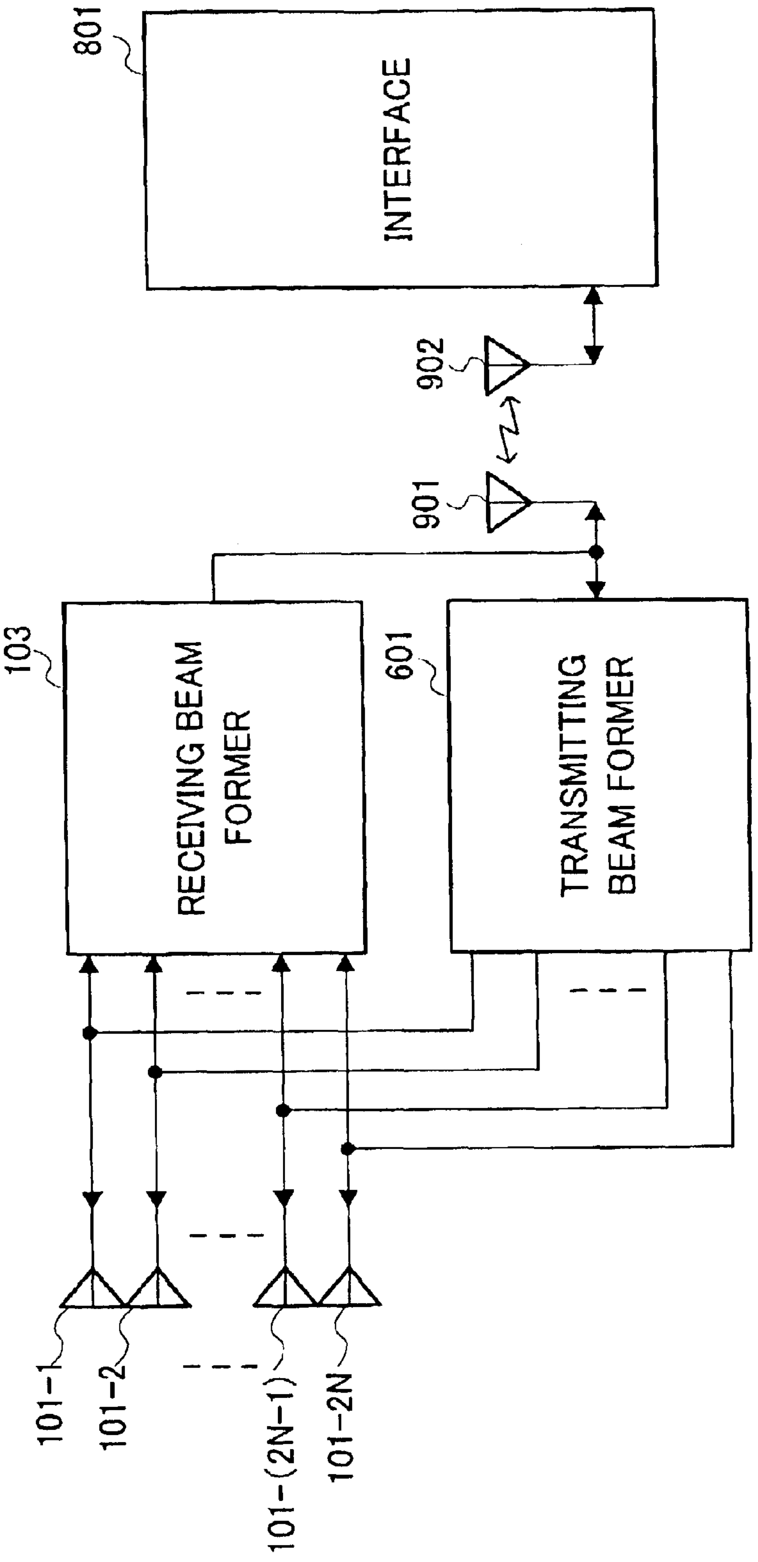
FIG. 9 is a block diagram showing a configuration of wireless apparatus according to the fourth embodiment of the invention.

FIG. 9 is a block diagram showing a configuration of a mobile wireless terminal apparatus according to the fourth embodiment of the invention. Parts in this figure identical to those of FIG. 8 are assigned the same numerals as in FIG. 8 without further explanations.

The difference in FIG. 9 relative to FIG. 8 is that interface 801 and an array antenna apparatus are separate and wireless-connected by means of short distance wireless communication such as Bluetooth via antenna 901 mounted to the array antenna apparatus and antenna 902 mounted to interface 801.

A received signal output from receiving beam former 103 is transmitted from antenna 901 mounted to the array antenna apparatus to antenna 902 mounted to interface 801. When a signal is transmitted from the array antenna apparatus, interface 801 notifies the operator by such means as displaying it on a display unit and by outputting it as speech information.

Moreover, the operator inputs transmission data into interface 801 including character information and speech information etc, and interface 801 transmits the transmission data from antenna 902 to antenna 901. The signal transmitted from interface 801 is received by antenna 901 and input into transmitting beam former 601.

When an array antenna apparatus and an interface are unifying, there is a likelihood that the null direction does not coincide with the human body, depending on the manner of use and the circumstances of use, such as when the operator uses an earphone while talking. According to the present invention, an array antenna apparatus and an interface are separate, and it is possible to fix the array antenna apparatus to the human being and carry it thus, so as to constantly place the human body in the null direction. By this means, it is possible to realize a mobile wireless terminal apparatus that reduces the influence from the human body and that reduces the radiation to the human body, regardless of the manner of use and the circumstances of use.

Further still, receiving beam former 103 of the present embodiment may be configured to implement diversity reception wherein antenna elements of good receiving sensitivity are selected, instead of forming a directivity.

(Fifth Embodiment)

A case will be described here with the present embodiment where an array antenna apparatus that accords with the description of the third embodiment is mounted to an information apparatus or to a wireless communication module and the like.

Figure 10:
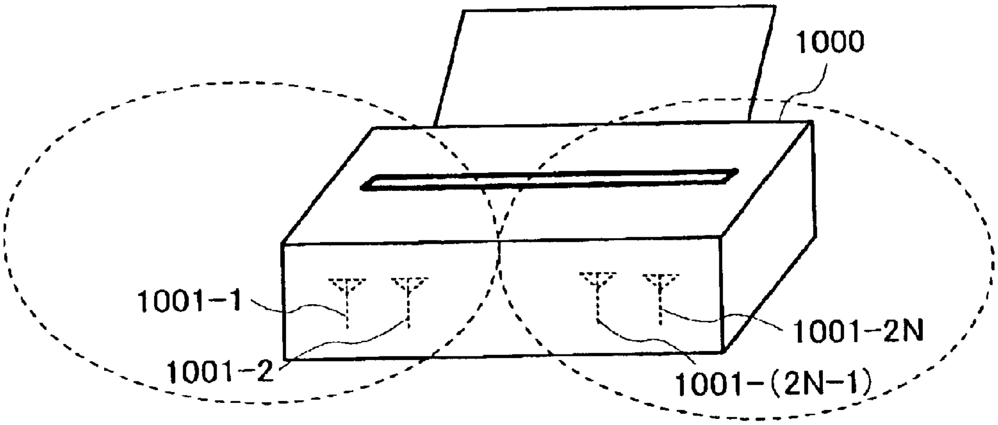
FIG. 10 is an external view of a printer according to the fifth embodiment of the invention.

FIG. 10 is an external view of a printer according to the fifth embodiment of the invention. In this figure, antenna elements 1001-1~1001-2N are disposed in the inside front of printer 1000.

Antenna elements 1001-1~1001-2N are disposed perpendicularly to the surface on which the printer is positioned and at regular intervals.

By this means, the array antenna apparatus can form a directivity such as shown in dotted lines. As shown in FIG. 10, with a null created in the front of the printer, it is possible to reduce the radiation of radio waves to the human body and equipment such as when feeding paper, and likewise reduce the influence from the human body and equipment present in the null direction. Incidentally, the antenna elements can be disposed in the inner rear of the printer.

Figure 11:
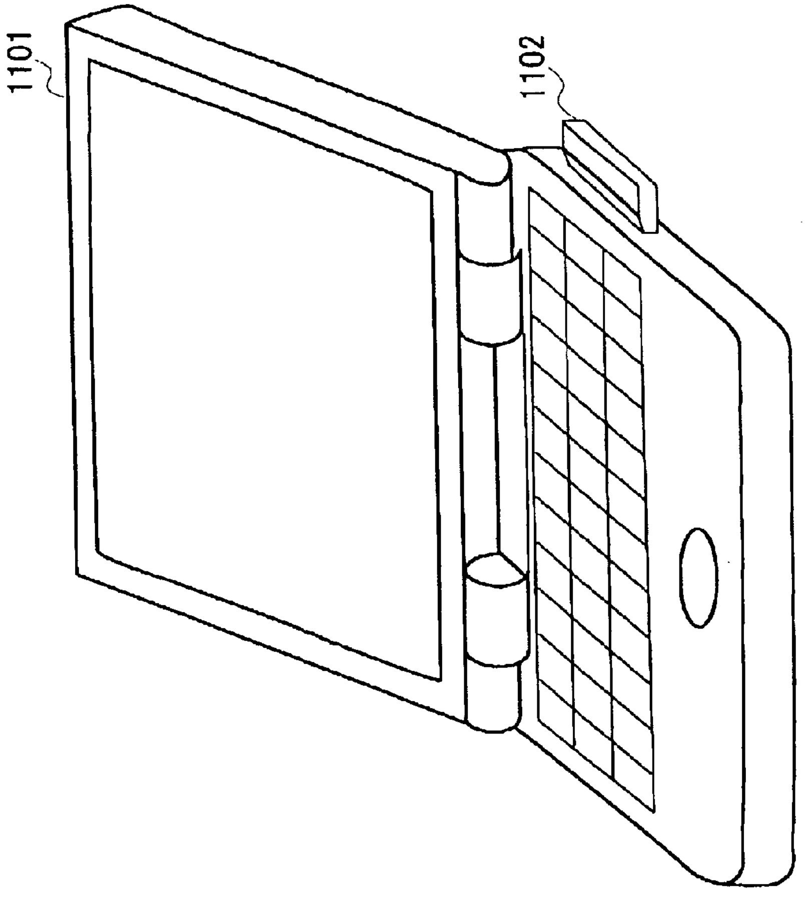
FIG. 11 shows a sample usage of a wireless communication module according to the fifth embodiment of the invention.

FIG. 11 shows a sample usage of a wireless communication module according to the fifth embodiment of the invention. Personal computer 1101 has slot for wireless LAN card 1102 (wireless communication module) on a side of the body.

In accordance with the description of the third embodiment, wireless LAN card 1102 comprises an even number of antenna elements, receiving beam former 103, and transmitting beam former 601. Wireless communication can be performed using a computer, by inserting wireless LAN card 1102 into a slot on the computer.

Figure 12:
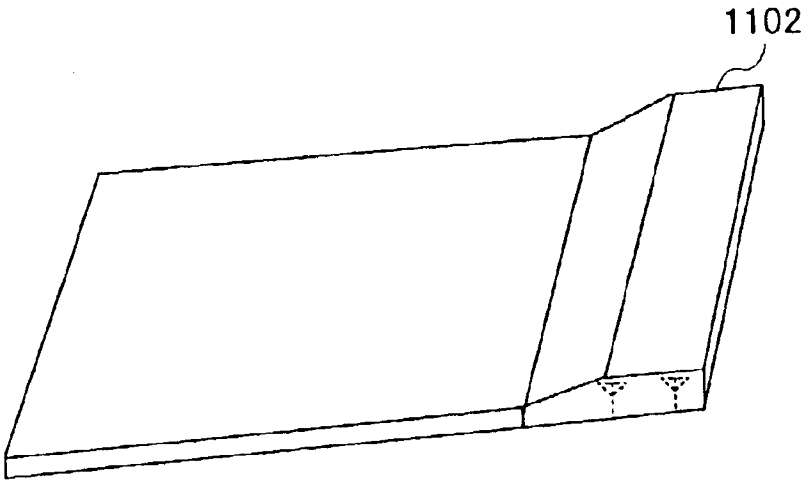
FIG. 12 shows an enlarged external view of a wireless LAN card.

FIG. 12 is an enlarged external view of wireless LAN card 1102. LAN card 1102 in this figure shows the position of the antenna elements assuming the card is input into a side of a body, such as with personal computer 1101 shown in FIG. 10. Thus, even where antenna elements are disposed at small intervals, it is still possible to realize a wireless LAN card of a simple configuration that can create a null in the direction where the human body is present (usually in front of personal computer 1101), and thus reduce the radiation to the human body and receive little influence from the human body.

Figure 13:
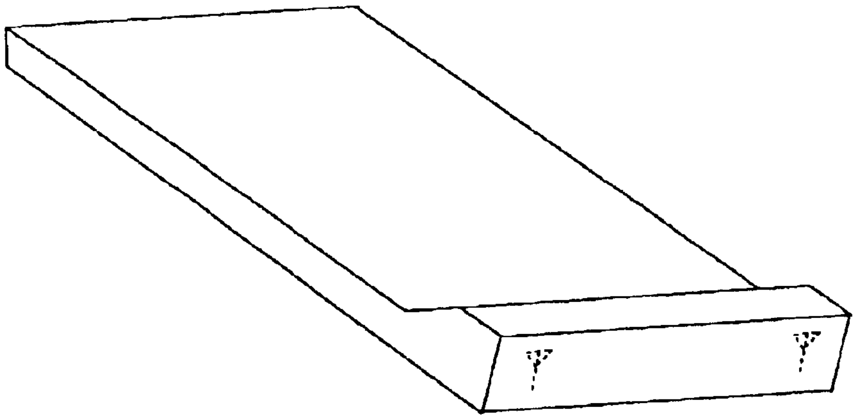
FIG. 13 shows an enlarged external view of a wireless LAN card.

When a slot is formed in the front or in the rear of the body of the personal computer as shown in FIG. 11, by disposing antenna elements as shown in FIG. 13, the same effect can be still achieved.

The array antenna apparatus of the present embodiment can be incorporated in a wireless network and furthermore applicable to apparatuses that have transmission/reception functions. It is furthermore applicable to card-type wireless communication modules that provide apparatuses with wireless LAN functions and such. That is, it is applicable to electronic apparatuses that feature transmitting/receiving functions.

Thus according to the present embodiment, mounting an array antenna apparatus that accords with the description of the third embodiment to an information apparatus and a wireless communication module and such makes it possible to form an 8-shape directivity, reduce the influence of radio wave radiation to the human body and equipment present in the null direction, and reduce the influence from the human body and equipment present in the null direction.

(Embodiment 6)

A case will be described here with the present embodiment where a mobile wireless terminal apparatus or an information apparatus of a folding configuration implements different directivities between when it is folded and when it is opened.

Figure 14A:
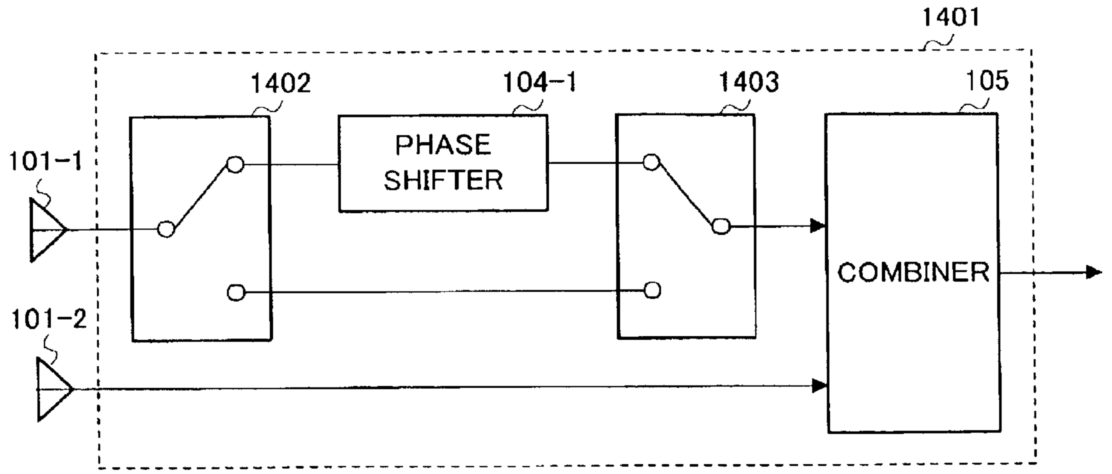
FIG. 14A is a block diagram showing an inner configuration of a receiving beam former according to the sixth embodiment of the invention.
Figure 14B:
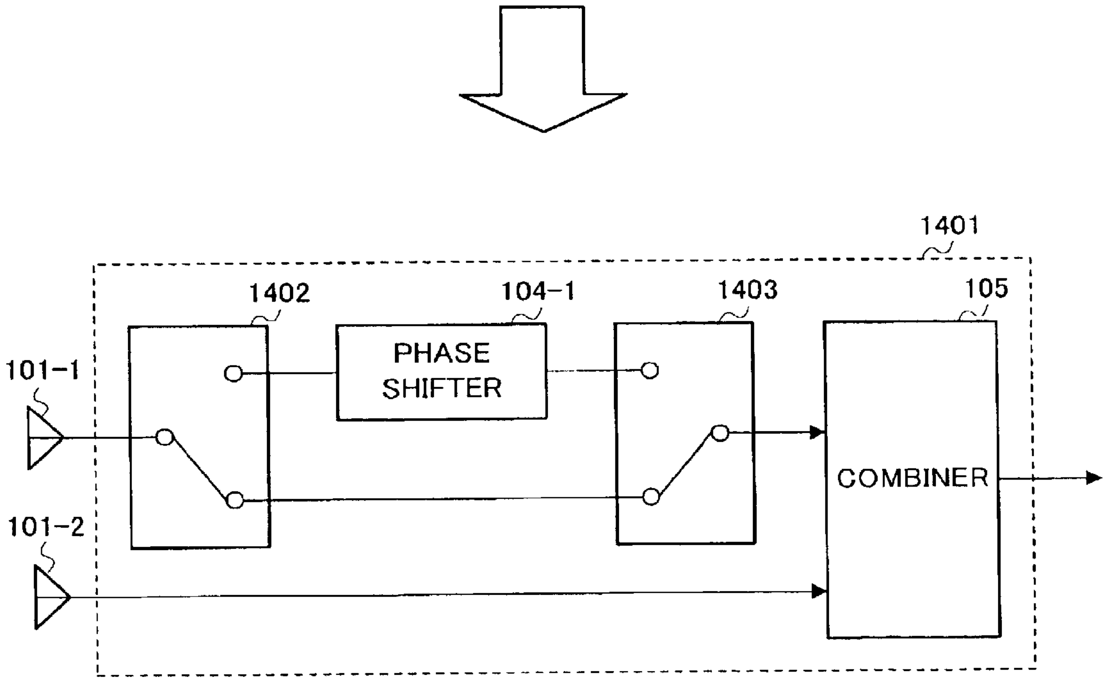
FIG. 14B is a block diagram showing an inner configuration of a receiving beam former according to the sixth embodiment of the invention.

FIG. 14A and FIG. 14B are each a block diagram showing an inner configuration of receiving beam former 1401 according to the sixth embodiment of the invention. Parts in these figures identical to those of FIG. 1 are assigned the same numerals as in FIG. 1 without further explanations. Referring to FIG. 14A and FIG. 14B, switch 1402 and switch 1403 switch between, inputting a received signal from an antenna into combiner 105 via phase-shifter 104-1, and inputting it directly into combiner 105 without going through phase shifter 104-1. FIG. 14A shows switch 1402 and switch 1403 connected such that a signal received by an antenna is input into combiner 105 via phase shifter 104-1. On the other hand, FIG. 14B shows switch 1402 and switch 1403 connected such that a signal received by an antenna is input into combiner 105 without going through phase shifter 104-1.

Referring to FIG. 14A, the signals received by the antenna elements on one side are phase-shifted in such a way that allows a π phase difference between the signals received by adjacent antenna elements, thereby forming an 8-shape directivity. On the other hand, referring to FIG. 14B, the signals received by the antennas are combined in-phase, which results in substantially non-directivity when the interval between the antenna elements is less than 0.5 wavelengths.

Figure 15A:
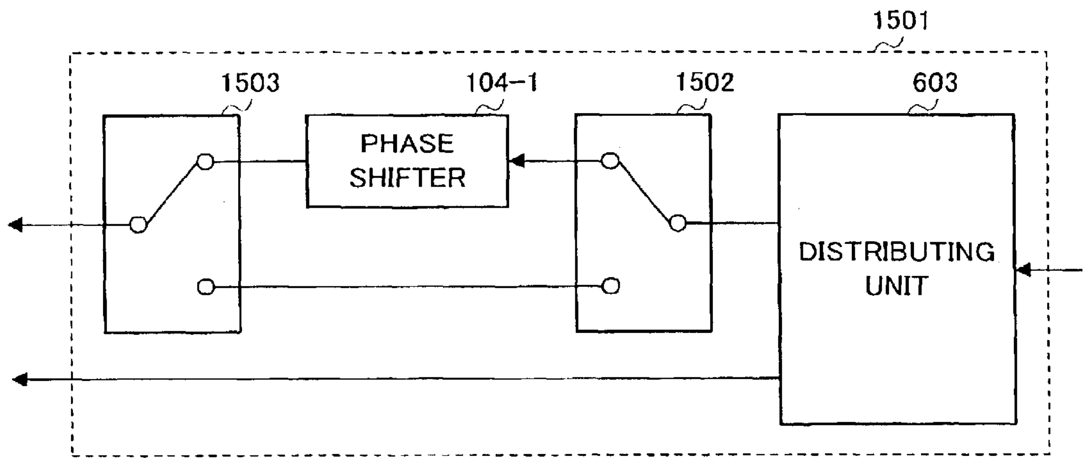
FIG. 15A is a block diagram showing an inner configuration of a transmitting beam former according to the sixth embodiment of the invention.
Figure 15B:
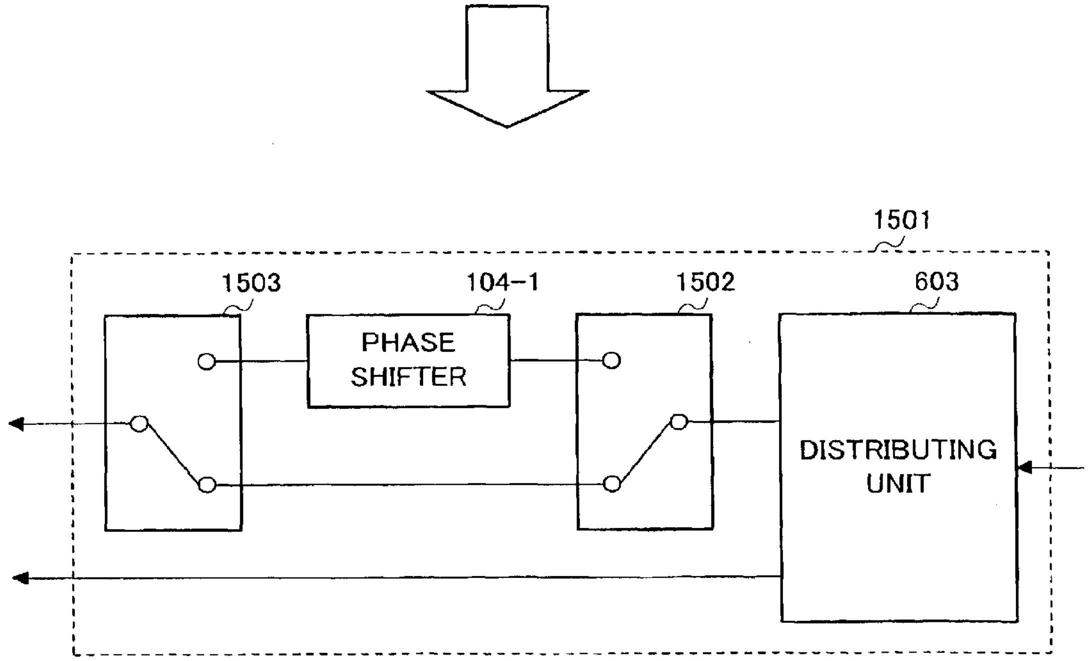
FIG. 15B is a block diagram showing an inner configuration of a transmitting beam former according to the sixth embodiment of the invention.

FIG. 15A and FIG. 15B are each a block diagram showing an inner configuration of transmitting beam former 1501 according to the sixth embodiment of the invention. Parts in these figures identical to those of FIG. 6 are assigned the same numerals as in FIG. 6 without further explanations.

Referring to FIG. 15A and FIG. 15B, again, switch 1502 and switch 1503 switch between inputting and not inputting the transmitting signals of one side transmitted from distributing unit 603 into phase shifter 104-1. FIG. 15A shows switch 1502 and switch 1503 connected such that a signal divided in distributing unit 603 goes through phase shifter 104-1. On the other hand, FIG. 15B shows switch 1502 and switch 1503 connected such that a signal divided in distributing unit 603 does not go through phase shifter 104-1. FIG. 15A corresponds to FIG. 14A, wherein an 8-shape directivity is formed. FIG. 15B corresponds to FIG. 14B, wherein there is substantially no directivity.

Figure 16A:
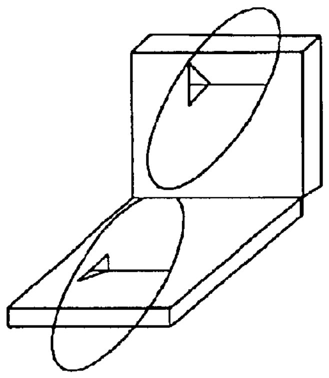
FIG. 16A is conceptual diagram showing a directivity formed when a mobile wireless terminal apparatus of a folding configuration according to the sixth embodiment of the invention is opened.
Figure 16B:
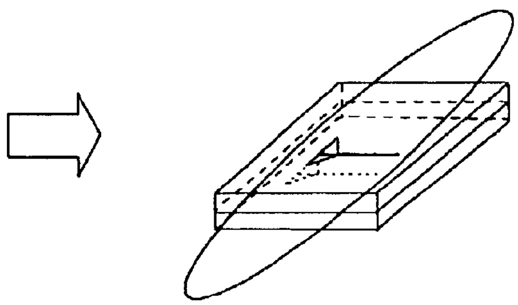
FIG. 16B is a conceptual diagram showing a directivity formed when a mobile wireless terminal apparatus of a folding configuration according to the sixth embodiment of the invention is folded.

FIG. 16A is a conceptual diagram showing a directivity formed when the mobile wireless terminal apparatus of a folding configuration according to the sixth embodiment of the invention is opened. When antenna elements are disposed as shown in this figure, an 8-shape directivity such as shown in the figure forms. On the other hand, FIG. 16B is a conceptual diagram showing a directivity formed when the mobile wireless terminal apparatus of a folding configuration according to the sixth embodiment of the invention is folded. When the mobile wireless terminal apparatus is folded, there is substantially no directivity as shown in FIG. 16B.

The configuration whereby the directional patterns switch between when the mobile wireless terminal apparatus is folded and when the mobile wireless terminal apparatus is opened has been achieved by focusing on the fact that the mobile wireless terminal apparatus is close to the human head while talk is in progress, and needs to receive radio waves that arrive from any directions effectively during the waiting period.

That is, while talk is in progress, the mobile wireless terminal apparatus is opened and used at a short distance from the human head, and so by forming an 8-shape directivity in such a way that creates a null in a direction where the human head is likely to be present, it is possible to reduce the radiation of radio waves to the human head and reduce the absorption of radio waves into the human head. In addition, during the waiting period, the mobile wireless terminal apparatus is rarely close to the human head, in which case, signals that arrive from various directions are more effectively received with non-directivity rather than by forming a directivity.

Figure 17A:
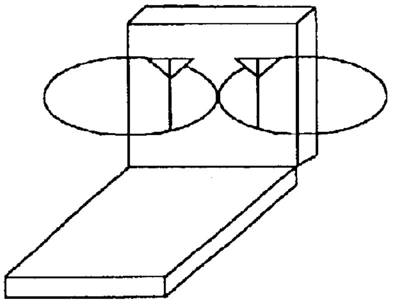
FIG. 17A is a conceptual diagram showing a directivity formed when a mobile wireless terminal apparatus of a folding configuration according to the sixth embodiment of the invention is opened.
Figure 17B:
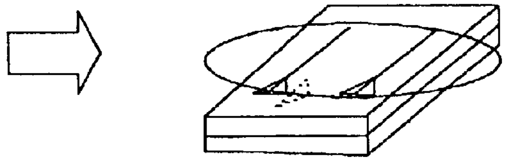
FIG. 17B is a conceptual diagram showing a directivity formed when a mobile wireless terminal apparatus of a folding configuration according to the sixth embodiment of the invention is folded.

The manner of disposing antenna elements may accord with FIG. 17A and FIG. 17B. Although the directivity forms differently compared to the directivity shown in FIG. 16A and FIG. 16B, the open-state directivity causes a null in a direction where the human head is highly likely to be present.

Figures 18A, 18B:
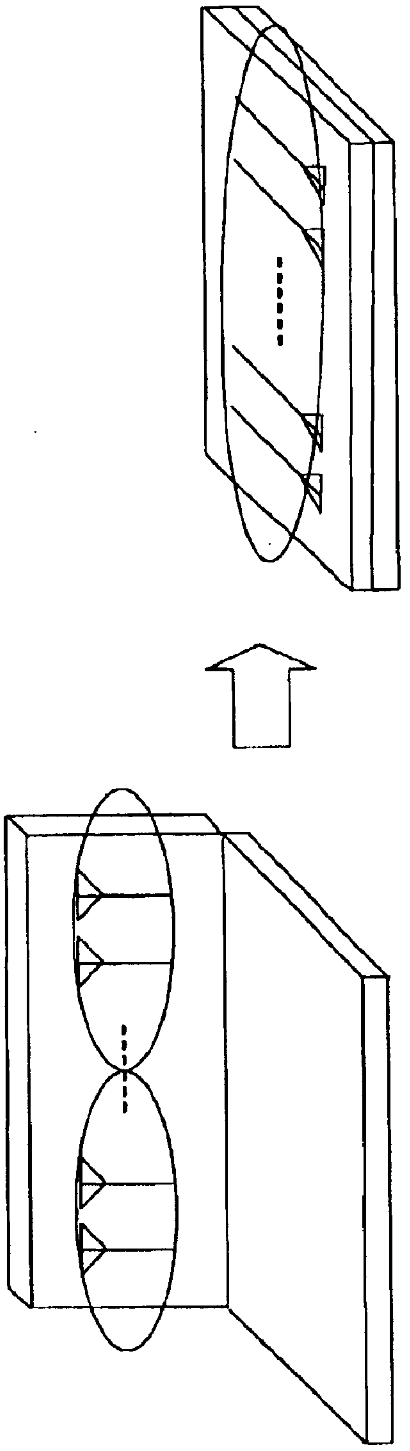
FIG. 18A is a conceptual diagram showing a directivity formed when a mobile wireless terminal apparatus of a folding configuration according to the sixth embodiment of the invention is opened.
FIG. 18B is a conceptual diagram showing a directivity formed when a mobile wireless terminal apparatus of a folding configuration according to the sixth embodiment of the invention is folded.

FIG. 18A is a conceptual diagram showing a directivity formed when the information apparatus of a folding configuration is opened, while FIG. 18B is a conceptual diagram showing a directivity formed when the information apparatus of a folding configuration is folded. The number of antenna elements differs relative to FIG. 16A, FIG. 16B, FIG. 17A, and FIG. 17B, yet the switching of directivities between the open state and the folded state is the same.

Thus the above present embodiment is configured such that, when the apparatus is opened and the frequency of use near the human head is high such as while talk is in progress, an 8-shape directivity forms in such a way that creates a null in the direction where the human head is present, thereby reducing the radiation of radio waves to the human head and also reducing the absorption of radio waves into the human head. Moreover, when the apparatus is folded during the waiting period, it is possible to effectively receive signals that arrive from any directions by means of non-directivity.

When the apparatus is carried close to the human body during the waiting period, it is possible to fix a switch and a phase shifter connected while the apparatus is closed, as shown in FIG. 14A and FIG. 15A. An 8-shape directivity is formed by this means, and so it is possible to reduce the radiation of radio waves to the human body and also reduce the influence from the human body.

Moreover, when signals are processed digitally, it is possible to digitally control the amplitude/phase of the signals received by/transmitted from the antenna elements.

Furthermore, the receiving beam former may be configured to implement diversity reception wherein the antenna elements of good receiving sensitivity are selected, without forming a directivity.

As described above, according to the present invention, an even number of antenna elements are disposed on a linear line at regular intervals to be parallel to each other, received signals are phase-shifted in such a way that allows a π (or −π) phase difference between the signals received by adjacent antenna elements, and these signals are combined and received. Moreover, a transmitting signal is divided into a number corresponding to the number of antenna elements, and transmitting signals are transmitted in such a way that the phase difference between the signals transmitted form adjacent antenna elements becomes π (or −π). By this means, with an antenna apparatus of a small and simple configuration, it is possible to form an 8-shape directivity in such a way that creates a null in the vertical direction to the linear line that links the antenna elements.

The present application is based on Japanese Patent Application No. 2001-270141 filed on Sep. 6, 2001, the entire content of which is incorporated herein by reference,

INDUSTRIAL APPLICABILITY

The present invention is suitable for use in electronic apparatuses such as cellular phones.

What is claimed is:

1. An array antenna apparatus, comprising:

an even number of antenna elements, arranged along a linear line at regular intervals;

a phase shifter, associated with every other antenna element arranged along the linear line, that shifts a phase of a received signal by π; and a combiner that combines a received signal that is phase shifted by the phase shifter and a received signal that is not phase shifted by the phase shifter.

2. The array antenna apparatus according to claim 1, further comprising:

a switch that switches between combining the received signal that is phase shifted by the phase shifter, and the received signal not phase shifted by the phase shifter; and the combiner combines the signals individually received by the antenna elements.

3. An array antenna apparatus, comprising:

an even number of antenna elements, arranged along a linear line at regular intervals;

a distributor that divides a transmission signal into a number of divided transmission signals according to the number of the antenna elements; and a phase shifter, associated with every other antenna element arranged along the linear line, that shifts the phase of at least one of the divided transmission signals by π.

4. The array antenna apparatus according to claim 3, further comprising:

a switch that switches between the divided transmission signals phase shifted by π by the phase shifter and the divided transmission signals not phase shifted; and the switch connecting the divided transmission signals to the individual antenna elements.

5. An array antenna apparatus, comprising:

an even number of antenna elements, arranged along a linear line at regular intervals;

a first phase shifter, associated with every other antenna element arranged along the linear line, that shifts a phase of a received signal by π;

a combiner that combines a received signal that is phase shifted by the first phase shifter and a received signal not phase shifted by the first phase shifter;

a distributor that divides a transmission signal into a number of divided transmission signals according to the number of the antenna elements; and a second phase shifter, associated with every other antenna element arranged along the linear line, that shift a phase of divided transmission signals by π.

6. An electronic apparatus comprising the array antenna apparatus of claim 5.

7. An electronic apparatus connected to the array antenna apparatus of claim 5 with a short distance wireless communicator.

8. The array antenna apparatus according to claim 5, wherein the combiner comprises:

a first switch that switches between combining the received signal that is phase shifted by the first phase shifter, and the received signal not phase shifted by the first phase shifter, to combine the signals individually received by the antenna elements; and a second switch that switches between the divided transmission signals phase shifted by π by the second phase shifter, and the divided transmission signals for the individual antennas elements.

9. An electronic apparatus that is configured to have a folded configuration, comprising:

antenna elements positioned in an upper portion of a case and in a lower portion of the case, said antenna elements opposing each other when the case is folded;

a first phase shifter, associated with one of the antenna elements, that shifts a phase of a received signal by π;

a combiner that combines a received signal, that is phase shifted by the first phase shifter, and a received signal not phase shifted by the first phase shifter when the case is open, and that combines signals individually received by the antenna elements when the case is folded;

a distributor that divides a transmission signal into a number of signals according to the number of the antenna elements; and a second phase shifter, associated with one of the antenna elements, that shifts the phase of divided transmission signals by π when the ease is open, and that transmits the divided transmission signals from the individual antenna elements when the case is folded.

10. An electronic apparatus that is configured to have a folding configuration, comprising:

antenna elements provided in one of an upper portion of a case and a lower portion of the case, said antenna elements arranged along a linear line at regular intervals;

a first phase shifter, associated with every other antenna element arranged along the linear line, that shifts a phase of a received signal by π;

a combiner that combines the received signal, that is phase shifted by the first phase shifter, and a received signal not phase shifted by the first phase shifter when the case is open, and that combines signals individually received by the plurality of antenna elements when the case is folded;

a distributor that divides a transmission signal into a number of signals according to the number of the antenna elements; and a second phase shifter, associated with every other antenna element arranged along the linear line, that shifts the phase of divided transmission signals by π when the case is open, and that transmits the divided transmission signals from the individual antenna elements when the case is folded.

* * * * *